Patented Dec. 12, 1950

2,533,376

UNITED STATES PATENT OFFICE 2,533,376

COPOLYMERIZATION OF MALEIC ANHYDRIDE AND ALLYL ESTERS OF LONG CHAIN MONOCARBOXYLIC ACIDS

John Leslie Jones, Los Angeles, Calif., assignor to Libbey-Owens-Ford Glass Company, Toledo, Ohio, a corporation of Ohio No Drawing. Application October 23, 1947, Serial No. 781,765. In Canada June 14, 1946

14 Claims. (Cl. 260—78.4)

The invention relates to the copolymerization of unsaturated substances, and particularly to a novel copolymerization reaction and novel products resulting therefrom.

Maleic anhydride can be polymerized with great difficulty, if at all. Monoallyl esters in general can be polymerized only with great difficulty and tend to form only polymers of very low molecular weight. However, in accordance with the present invention maleic anhydride is copolymerized with certain monoallyl esters to give copolymers having unique properties. This reaction is a true copolymerization because it proceeds very rapidly when the reactants are maleic anhydride and the monoallyl ester which alone can be polymerized only very slowly, if at all.

The principal object of the invention is the preparation of useful new copolymerization products and derivatives thereof, including fusible and infusible synthetic resins. More specific objects and advantages are apparent from the description, which merely discloses and illustrates the invention and is not intended to impose limitations upon the claims.

The copolymer molecules appear to contain the unreacted anhydride groups derived from maleic anhydride, and various useful derivatives of the copolymers may be prepared by reactions characteristic of such anhydride groups (e. g., the reaction of a hydroxy compound, such as an alcohol or an inorganic base with the anhydride groups). Many of the copolymers form water-soluble sodium, potassium or ammonium salts by reaction with the corresponding bases. Solutions of such salts are advantageous in that their viscosities are relatively low. A solution, in the same concentration, of a soluble salt of a copolymer of styrene and maleic anhydride has a much greater viscosity. Even a 2 to 3 per cent aqueous solution of a soluble salt of a styrene-maleic anhydride copolymer is a jelly that is highly impractical to handle commercially.

A soluble salt embodying the invention, such as a soluble salt of a copolymer of maleic anhydride with the allyl or methallyl ester of lauric, stearic or another long chain fatty acid (i. e., an acid having at least about 6 carbon atoms), may be used in water proofing, crease proofing and weighting textiles and fabrics. After a solution or emulsion of a salt embodying the invention has been used to impregnate a fabric, the fabric may be treated with a solution of alum or another substance containing a metal ion that forms an insoluble salt of the copolymer.

A copolymer embodying the invention may be esterified with an alcohol. One hydroxy group in the molecule of a polyhydric alcohol, preferably a dihydric alcohol, may be esterified with each anhydride group in a fusible copolymer embodying the invention to produce a fusible, soluble, viscous resin which has both carboxy and alcoholic hydroxy groups and therefore is heat-convertible by further esterification which cross-links the resin molecules. Such a heat-convertible product is highly useful in finishes such as baking enamels.

Esterification of a monohydric alcohol with a copolymer embodying the invention or reaction of such a copolymer with an amine to form an amide linkage tends to increase the water resistance of the copolymer.

The instant invention is based on the discovery that extremely useful products may be obtained by the copolymerization of maleic anhydride and certain allyl derivatives having molecules which contain long chain monocarboxylic acid radicals.

An allyl derivative with which maleic anhydride may be copolymerized in the practice of the invention is a substance, consisting of hydrogen, carbon and oxygen atoms, which is an ester of an unsubstituted beta-gamma-olefinic alcohol having from three to four carbon atoms of which not more than three form a chain in series with a long chain (i. e., containing at least about six carbon atoms) aliphatic monocarboxylic acid. Such beta-gamma-olefinic alcohol may be allyl or methallyl alcohol.

A substance containing only one allyl or methallyl radical, upon copolymerization with maleic anhydride, produces a thermoplastic resin, apparently having linear molecules. The resin molecules, in any case, are believed to be produced by copolymerization of double bonds in the allyl derivative molecules with double bonds in the maleic anhydride molecules.

When each molecule of the allyl derivative contains only one double bond, there is a tendency for the allyl derivative to react with the maleic anhydride in equimolecular proportions regardless of the proportions of reactants employed. In such a case the use of equimolecular proportions appears to give an approximately 100 per cent yield in bulk copolymerization. This tendency does not hold invariably, however, because the proportions reacting are influenced slightly and sometimes strongly by the proportions used.

The copolymerization product of the invention ranges from a hard fusible resin to an elastic fusible resin as the length of the carbon chain in the monocarboxylic acid radical increases. The preferred allyl ester for copolymerization with maleic anhydride is an ester of allyl or methallyl alcohol with an unsubstituted, normal aliphatic monocarboxylic acid having not more than about eighteen carbon atoms.

Thermoplastic resins embodying the invention thus prepared are soluble in various solvents. Since they contain anhydride groups, they may be reacted with various modifiers to produce molding, coating and adhesive resins.

A copolymer embodying the invention may be produced by copolymerizing maleic anhydride with one or more selected monomeric or partially polymerized allyl derivatives, with or without any other polymerizable or unpolymerizable substance or substances, such as styrene or an inert solvent.

A copolymerization reaction embodying the invention may be carried out by exposure to the air or to ultra-violet light, but the polymerization is accelerated by the use of a catalyst, particularly at room temperatures or moderately elevated temperatures. Any organic peroxide, such as benzoyl peroxide, succinyl peroxide, acetyl peroxide, peracetic acid, perbenzoic acid, toluyl peroxide, p-brombenzoyl peroxide, anisoyl peroxide, chloracetyl peroxide, acetyl benzoyl peroxide, diacetyl peroxide, or furoyl peroxide, or any organic ozonide, such as diisopropylene ozonide or diisobutylene ozonide, or a mixture of such substances, may be used as the curing catalyst. The amount of catalyst used is simply that amount which causes the hardening or copolymerization to take place at the desired rate. Diacetyl peroxide has been found to produce particularly good yields and color in bulk copolymerization of maleic anhydride with a monoallyl ester.

The rate of polymerization may be controlled by varying the temperature. The temperature employed may be any temperature at which the reaction is controllable in the appartus available.

The copolymerization may be carried out in bulk, or in solution or emulsion in an inert vehicle. Copolymers embodying the invention are relatively insoluble in alcohols. However, when such a copolymer is refluxed for several hours with an alcohol, even in the absence of an acid catalyst, a product soluble in the alcohol is formed, apparently by reaction of one alcohol molecule with the anhydride group in the resin. After one molecule of an alcohol has reacted with an anhydride group in the resin, a free carboxy group remains from the anhydride group.

The elastic copolymers of maleic anhydride with allyl or methallyl esters of long chain fatty acids (e. g., lauric, myristic and stearic acids) in general adhere strongly to glass. The most elastic types may be used as safety glass interlayers. Reaction of each anhydride group in such a copolymer with one molecule of an alcohol such as methyl or lauryl alcohol produces a product of improved water resistance that is still adherent to glass and metals.

When one hydroxy group in the molecule of a dihydric alcohol is reacted with the anhydride group in a copolymer of maleic anhydride with the allyl or methallyl ester of a monocarboxylic acid to produce a heat-convertible resin, the properties of the coating produced by baking a film of the resin are dependent primarily upon the chain length of the monocarboxylic acid and secondarily upon the chain length of the dihydric alcohol. A copolymer derived from an ester of a monocarboxylic acid containing from about six to about eight carbon atoms yields particularly good heat-convertible derivatives, having high solvent tolerance.

In the reaction of one hydroxy group in the molecule of a dihydric alcohol with the anhydride group in a copolymer of maleic anhydride with a monoallyl or monomethallyl compound to produce a heat-convertible resin, an excess of the dihydric alcohol should be used, although only one molecule of the dihydric alcohol actually reacts with each anhydride group in the copolymer. If an excess of the dihydric alcohol is not used, cross-linking and jelling by reaction of one dihydric alcohol molecule with two different copolymer molecules may occur.

The reaction product of a dihydric alcohol with a fusible copolymer embodying the invention is heat-convertible because its molecules contain both acid or anhydride radicals, and hydroxy groups at the free ends of the dihydric alcohol radicals. Upon baking, a film of such a product is converted into an infusible resin by cross-linking resulting from the esterification of a free hydroxy group on one molecule with an acid or anhydride group on another molecule.

The reaction product of a fusible copolymer embodying the invention with an alcohol, preferably a dihydric alcohol, may be used as a plasticizer in an alcohol-soluble urea-formaldehyde reaction product for use in a coating composition such as a baking enamel.

A copolymerization reaction embodying the invention may be carried out in an open or closed mold to produce a casting. A fusible copolymer embodying the invention may be shaped for compression or injection molding like other thermoplastic resins. In the production of cast or molded articles, plasticizers, lubricants, fillers, pigments and other coloring matter may be incorporated if desired.

A solution of a copolymer embodying the invention, containing any desired modifiers, may be used as a binder in the production of impregnated or laminated products, as an adhesive, as a dressing or modifying agent for papers and fabrics or as a coating composition.

The proportion of maleic anyhdride to allyl or methallyl ester used in the composition for copolymerization may vary widely. For example, the molal ratio of maleic anhydride to the ester may range from about 1:5 to about 5:1. In many cases, the proportions that actually copolymerize may be limited, but the proportions brought together to bring about the copolymerization may be varied widely in order to influence the course of the copolymerization or to cause the maximum proportion of one ingredient or the other to take part in the copolymerization.

*Example 1*

A mixture of one mol of maleic anhydride and one mol of a monoallyl ester (allyl caproate), containing an amount of catalyst (diacetyl peroxide) equal to 0.5 per cent by weight of the mixture, is held at 70° C. on a water bath for 20 to 24 hours.

The product is a hard, clear, colorless, fusible solid, the yield being substantially 100 per cent. The use of 0.25 per cent of the catalyst with these reactants gives the same results.

*Example 2*

A procedure is carried out which is the same as the procedure of Example 1 except that the monoallyl ester used is allyl levulinate, and the product obtained is the same as in Example 1.

*Example 3*

A procedure is carried out which is the same as Example 1 except that the monoallyl ester used is allyl laurate, and the product obtained is an elastic, clear, colorless, fusible solid.

*Example 4*

A procedure is carried out which is the same as the procedure of Example 1 except that the monoallyl ester used is allyl myristate, and the product obtained is an elastic, clear, fusible solid, pale straw in color.

*Example 5*

A procedure is carried out which is the same as the procedure of Example 1 except that the monoallyl ester used is allyl stearate, and the product obtained is a soft, waxy, fusible solid, pale straw in color.

*Example 6*

A procedure is carried out which is the same as the procedure of Example 2 and an acetone solution of the product so prepared (allyl levulinate-maleic anhydride copolymer) is added, drop by drop with stirring, to methanol. The copolymer which precipitates, is redissolved in acetone, and the procedure is repeated to purify the copolymer. One gram of dry, purified copolymer so prepared is then dissolved in 50 cc. of acetone and titrated with 0.5 normal aqueous sodium hydroxide solution to the phenolphthalein endpoint. One mol of sodium hydroxide is found to be capable of neutralizing about 144 grams of the copolymer. If the copolymer had been formed by the copolymerization of maleic anhydride and allyl levulinate (molecular weight 156) in exactly equimolecular proportions, one mol of sodium hydroxide would have been capable of neutralizing 127 grams of the copolymer.

*Example 7*

A mixture consisting of 31.2 grams of a copolymer prepared in accordance with Example 1 (allyl caproate-maleic anhydride copolymer), 42.4 grams of diethylene glycol and 50 grams of methyl ethyl ketone is held at 85° C. under a reflux condenser for two hours. The product so obtained is a light straw-colored, very viscous solution, compatible with n-butyl alcohol, xylol and butyl acetate.

On baking at 325° F. for forty-five minutes the foregoing product forms a hard, flexible, colorless film.

*Example 8*

A procedure is carried out which is the same as the procedure of the first paragraph of Example 7 except that ethylene glycol (18.6 grams) is used instead of the diethylene glycol, and the reaction is carried out for six hours instead of two hours. The product so obtained is the same as in Example 7.

*Example 9*

A mixture of 28.8 grams of a copolymer prepared in accordance with Example 3 (allyl laurate-maleic anhydride copolymer), 11.1 grams of ethylene glycol and 40 grams of methyl ethyl ketone is held at 80° C. under a reflux condenser for three hours. The product so obtained is substantially the same as in Examples 7 and 8, and such product on baking at 325° F. for forty-five minutes forms a flexible, colorless film.

If a procedure is carried out which is the same as that described in the foregoing paragraph except that the amount of ethylene glycol used is 21.7 grams instead of 11.1 grams and the reaction is carried out at 90° C., the product so obtained is substantially the same as the product described in the foregoing paragraph.

This is a continuation-in-part of application Serial No. 645,009, filed February 1, 1946 and now abandoned.

Having described the invention, I claim:

1. A polymerizable composition consisting of (1) maleic anhydride and (2) an ester of (a) an unsubstituted beta-gamma-olefinic monohydric alcohol having from three to four carbon atoms of which not more than three form a chain in series with (b) an unsubstituted, saturated, aliphatic monocarboxylic acid having from six to eighteen carbon atoms.

2. A polymerizable composition consisting of (1) maleic anhydride and (2) an ester of (a) an unsubstituted beta-gamma-olefinic monohydric alcohol having from three to four carbon atoms of which not more than three form a chain in series with (b) an unsubstituted, saturated, aliphatic monocarboxylic acid having from six to eight carbon atoms.

3. The product of the polymerization of a composition consisting of (1) maleic anhydride and (2) an ester of (a) an unsubstituted beta-gamma-olefinic monohydric alcohol having from three to four carbon atoms of which not more than three from a chain in series with (b) an unsubstituted, saturated, aliphatic monocarboxylic acid having from six to eighteen carbon atoms.

4. The product of the polymerization of a composition consisting of (1) maleic anhydride and (2) an ester of (a) an unsubstituted beta-gamma-olefinic monohydric alcohol having from three to four carbon atoms of which not more than three from a chain in series with (b) an unsubstituted, saturated, aliphatic monocarboxylic acid having from six to eight carbon atoms.

5. The product of the esterification of an alcohol with the product claimed in claim 3.

6. The product of the esterification of an alcohol with the product claimed in claim 4.

7. The product of the esterification of a polyhydric alcohol with the product claimed in claim 3.

8. The product of the esterification of a polyhydric alcohol with the product claimed in claim 4.

9. The product of the esterification of a dihydric alcohol with the product claimed in claim 3.

10. The product of the esterification of a dihydric alcohol with the product claimed in claim 4.

11. The product obtained by the reaction of an OH radical-containing compound of the class consisting of alcohols and inorganic bases with the anhydride groups present in the product claimed in claim 3.

12. The product obtained by the reaction of an OH radical-containing compound of the class consisting of alcohols and inorganic bases with the anhydride groups present in the product claimed in claim 4.

13. The product obtained by the neutralization of an inorganic base with the anhydride groups present in the product claimed in claim 3.

14. The product obtained by the neutralization of an inorganic base with the anhydride groups present in the product claimed in claim 4.

JOHN LESLIE JONES.

REFERENCES CITED

The following references are of record in the file of this patent:

UNITED STATES PATENTS

| Number | Name | Date |
| --- | --- | --- |
| 2,280,256 | Patterson | Apr. 21, 1942 |